UNITED STATES PATENT OFFICE.

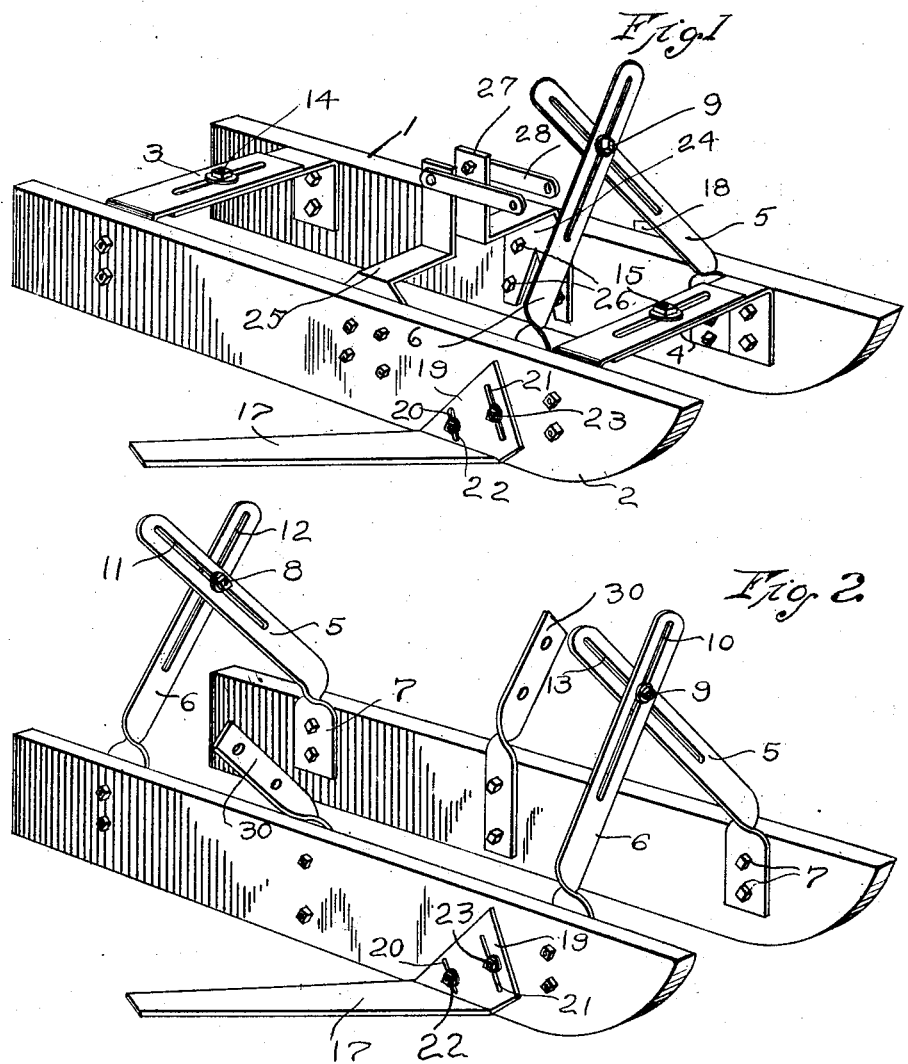

HENRY E. GEURIN AND WALTER D. DEAN, OF HERMLEIGH, TEXAS.

WEEDER.

1,094,552.

Specification of Letters Patent.

Patented Apr. 28, 1914.

Application filed July 8, 1913. Serial No. 777,866.

*To all whom it may concern:*

Be it known that we, HENRY E. GEURIN and WALTER D. DEAN, citizens of the United States, and residents of Hermleigh, in the county of Scurry and State of Texas, have made and invented certain new and useful Improvements in Weeders, of which the following is a specification.

Our invention relates to a new and useful improvement in weeders and more particularly to a weeder that is to be used in connection with or attached to a cultivator or lister and it has for its object to provide a device that will run over or straddle a hill and cultivate and weed or cut in the furrows on each side of the same.

Another object is to provide a device that will quickly and thoroughly cultivate the ground and will straddle the row and at the same time be so constructed that a proper allowance may be made for the height of the growing produce.

Another object of our invention is to produce a device that will be cheap to manufacture, easy to construct, neat in appearance and of but few parts.

With these and other objects in view our invention consists in certain new and novel features and combination of parts to be hereinafter more fully described and pointed out in the claims.

Still another object of our invention is to provide a weeder that may be so arranged if desired, that the runners thereof may travel in the furrow and be disposed at an angle to each other, and in this manner cause the blades secured to said runners to attain the same angle, which angle will correspond to the angle or slope of the hills to be cultivated.

In the drawings Figure 1 is a view in perspective of our improved weeder, and Fig. 2 is also a view in perspective of our improved weeder with the means attached for clearing the produce.

Referring now to the drawings, 1 and 2 are runners of any desired length and thickness and in this instance secured by the braces 3 and 4 (Fig. 1). Braces 5 and 6 are also shown and it will be understood that these are securely fastened to the runners 1 and 2 by the bolts 7. The braces 3 and 4 are bolted to the runners but these are always removed when the produce is of such a height that it will not be cleared and would contact with said braces; the braces 5 and 6 however are always left attached to the runners but the bolts 8 and 9 are moved upwardly in the slots 10 and 11, and 12 and 13 that are provided in the braces 5 and 6. These braces will be made or constructed as long as is found necessary and may be adjusted as above mentioned to suit the necessary requirements. However when the produce is very low or yet to break through the ground or the furrow has just been turned, braces 3 and 4 will be secured to the runner for the sake of additional strength as the ground will be much harder to weed or cultivate at this time as compared with when the ground has once been thoroughly broken and the produce has started. Also by constructing these two sets of braces as shown the distance between the runners may be lessened or greatened according to the size of the furrow, as it is well known that these may vary according to the size of the plow or lister used and it is necessary that the weeder straddle the hill and cultivate or weed the ground on each side thereof. This widening may be accomplished by simply unlocking the bolts 8 and 9 and 14 and 15. The runners are separated and placed the sufficient width, the bolts above mentioned are then securely locked thereby binding the runners in the desired position.

Attached to each runner on the outside thereof is a blade 17 and 18, these blades extending at an angle from the runners and having their inner ends as shown at 19 bent or turned at right angles and formed with slots 20 and 21. Passing through these slots are bolts which are locked by the nuts 22 and 23; and by constructing these blades in this manner the blades may be raised to a distance above the level of the ground or they may be lowered so that they will extend about four inches beneath the surface, and by providing two slots the blade may also be swung so that the front edge of the blade may be inclined either at an angle in an upward or downward direction. It will be understood however that the method of fastening these blades 17 and 18 to the runners forms no part of our present invention.

In Fig. 1 are shown the means for attaching the weeder to a lister or planter which preferably consist of two arms 24 and 25 which are secured to the runners by the bolts 26 and these arms are then bent in a vertical position as shown at 27 and provided with the additional arms 28. These arms 28 are then securely bolted to the foot of the planter. In Fig. 2 we have shown arms 30 secured to the runners and it will be noticed that these arms are differently shaped and are especially adapted to be used when the weeder is to be used in conjunction with a cultivator. These two forms of connecting means are changeable and of course their use will depend on the device with which the weeder is to be attached.

From the foregoing it will be seen that the weeder may be used simply attached to a lister or planter and if necessary cut the weeds on the surface of the ground or the blades may be lowered and it may cultivate the ground, or if desired it may be used afterward with a cultivator and proper allowance be made for the width of the furrows and for the height of the produce.

We have shown in the drawings (Fig. 1) one set of bars or braces and different set of bars in the second view but it will be understood that the two sets are used except when the produce is too high and the set shown in the first view is then removed. And it will also be seen that the weeder may be caused to travel in the furrows of the field to be cultivated, and by using the form as shown in Fig. 2 the runners may be disposed at an angle to each other and thereby regulate the angle of the blades, so that the surface of the hills will be sheered or traversed by the blades. The blades being thus disposed at an angle corresponding to the surface of the hills will simply cut the weeds and not enter too deeply therein, which if so would have a tendency to cut or spoil the produce.

Having thus described our invention what we claim as new and desire to secure by Letters Patent is:—

1. A weeder comprising runners, soil engaging members carried by said runners, braces secured at their lower ends to said runners and their upper portions disposed in anti-clinal relation, and means for retaining said braces in adjusted position.

2. A weeder comprising runners, soil engaging members carried by said runners, braces secured at their lower ends to said runners and their upper portions disposed in anti-clinal relation, the upper portion of each of said braces provided with a longitudinal slot and means passing within said slots to thereby retain the braces in their adjusted position.

3. A weeder comprising runners, soil engaging members carried by said runners, braces secured to each of said runners disposed in angular relation to each other, the upper portions of said braces provided with longitudinal slots and means for retaining said braces in their adjusted position.

Signed at Hermleigh, in the county of Scurry, and State of Texas, this 2 day of July A. D. 1913.

HENRY E. GEURIN.
WALTER D. DEAN.

Witnesses:
W. A. TAYLOR,
H. E. WELLS.

---

Copies of this patent may be obtained for five cents each, by addressing the "Commissioner of Patents, Washington, D. C."